United States Patent [19]
Tsuji et al.

[11] Patent Number: 5,807,941
[45] Date of Patent: *Sep. 15, 1998

[54] UNSATURATED NITRILE-CONJUGATED DIENE COPOLYMER PROCESS FOR PRODUCING SAME AND VULCANIZABLE RUBBER COMPOSITION

[75] Inventors: Suguru Tsuji, Tokyo; Yuichi Uchizono, Yokosuka, both of Japan

[73] Assignee: Nippon Zeon Co., Ltd., Tokyo, Japan

[ * ] Notice: The term of this patent shall not extend beyond the expiration date of Pat. No. 5,556,919.

[21] Appl. No.: 793,678

[22] PCT Filed: Jun. 7, 1995

[86] PCT No.: PCT/JP95/01133

§ 371 Date: Feb. 28, 1997

§ 102(e) Date: Feb. 28, 1997

[87] PCT Pub. No.: WO96/06869

PCT Pub. Date: Mar. 7, 1996

[30] Foreign Application Priority Data

| Aug. 29, 1994 | [JP] | Japan | 6-226099 |
| Sep. 7, 1994 | [JP] | Japan | 6-239395 |
| Sep. 7, 1994 | [JP] | Japan | 6-239396 |
| Sep. 30, 1994 | [JP] | Japan | 6-261364 |
| Sep. 30, 1994 | [JP] | Japan | 6-261365 |

[51] Int. Cl.$^6$ ............... C08F 236/12; C08F 2/38
[52] U.S. Cl. ............ 526/224; 524/436; 524/556; 524/557; 524/571; 524/572; 525/189; 526/85; 526/222; 526/335; 526/338; 526/342
[58] Field of Search ............... 526/85, 224, 222, 526/342, 335, 338; 525/189; 524/436, 556, 557, 571, 572

[56] References Cited

U.S. PATENT DOCUMENTS

| 4,421,884 | 12/1983 | Oyama | 524/209 |
| 4,965,326 | 10/1990 | Hörpel et al. | |
| 5,556,919 | 9/1996 | Oyama | 525/189 |
| 5,627,250 | 5/1997 | Tsuji | 526/338 |

FOREIGN PATENT DOCUMENTS

| 53-23390 | 3/1978 | Japan . | |
| 2-242802 | 9/1990 | Japan . | |
| 4-41511 | 2/1992 | Japan . | |
| 4-41512 | 2/1992 | Japan . | |
| 4-323203 | 11/1992 | Japan . | |
| 5-50530 | 7/1993 | Japan . | |
| 828803 | 2/1960 | United Kingdom | 526/85 |
| 1018347 | 1/1966 | United Kingdom | 526/85 |

*Primary Examiner*—Fred Zitomer
*Attorney, Agent, or Firm*—Armstrong, Westerman, Hattori, McLeland & Naughton

[57] ABSTRACT

An saturated nitrile-conjugated diene copolymer obtained by copolymerizing acrylonitrile with butadiene in the presence of a free radical initiator and an alkylthiol compound as a molecular weight modifier. A part of the molecular weight modifier is incorporated in a monomer charge before polymerization, and the remainder thereof is incorporated in a polymerization mixture during polymerization. The alkylthiol compound has 12 to 16 carbon atoms, which include at least three tertiary carbon atoms, and further has a sulfur atom directly bound to at least one of the tertiary carbon atoms. The copolymer has a Mooney viscosity of 15 to 150 and contains 3 to 20 weight % of a fraction having a number average molecular weight of not larger than 35,000. The copolymer is used in combination with a sulfur-containing vulcanizer.

23 Claims, 1 Drawing Sheet

UNSATURATED NITRILE-CONJUGATED DIENE COPOLYMER PROCESS FOR PRODUCING SAME AND VULCANIZABLE RUBBER COMPOSITION

TECHNICAL FIELD

This invention relates to an unsaturated nitrile-conjugated diene copolymer, a process for producing the same, and a vulcanizable rubber composition comprising the copolymer and a vulcanizer. More particularly, it relates to a nitrile-conjugated diene copolymer having good mechanical strength and processability, a process for producing this copolymer wherein a specific thiol compound as a molecular weight modifier is added in lots in the course of polymerization, and a vulcanizable rubber composition comprising the copolymer and a sulfur-containing vulcanizer.

BACKGROUND ART

In recent years, injection molding has been widely employed for molding an acrylonitrile-butadiene rubber (hereinafter abbreviated to "NBR") in view of productivity and rationality, that is used in applications for which good oil resistance and thermal resistance are required. Recently the range of its use is increasing, which includes vibration insulating rubbers, electrical parts, automobile parts, industrial moldings and footwear.

For injection molding of NBR, a high fluidity and a high crosslinking efficiency, i.e., a high-rate vulcanizability, at a high-temperature and short-time vulcanization are generally required. However, in general, the higher the vulcanization temperature of rubber, the lower the degree of the crosslinking efficiency. Therefore injection molded articles have poor tensile stress and impact resilience as compared with compression molded articles (for example, see Journal of Society of Rubber Industry, Japan, vol. 59, No. 4, p 214–215, 1986).

To impart a high-rate vulcanizability to NBR, many proposals have been made, which include for example a method of introducing a functional group such as a carboxyl group or an amino group, a method of incorporating a suitable vulcanization promotor, and a method of conducting an emulsion polymerization using minimum amounts of an emulsifier and a coagulant and thus minimizing residual catalyst in NBR. However, the high-rate vulcanizability attained by these proposals is not on a high level and in some cases physical properties such as cold resistance and permanent set are impaired.

Further, contamination of a mold is conspicuous in the injection molding of NBR wherein vulcanization is carried out at a high temperature. That is, where the molding is repeated, staining materials are gradually deposited on the mold with the result of contamination of moldings and spoiling of the surface appearance. Therefore the mold must be cleaned at regular intervals, but the cleaning is time-consuming and costly and leads to reduction in productivity.

To avoid the contamination of a mold, proposals have been made wherein talc, sodium thiosulfate, carbon wax or silicone oil is incorporated in rubber. However, these proposals are generally not effective for commercially available general purpose NBR. Especially where the vulcanization is effected at a high temperature and a high rate as in injection molding, it is difficult to avoid the mold contamination.

Further, NBR is not satisfactory in processability although good processability is recently required. Therefore there is an increasing demand for improving the processability. As methods of improving the processability, there can be mentioned a method of incorporating a liquid polymer or a plasticizer and a method of conducting polymerization under conditions such that production of a high-molecular-weight fraction is suppressed. For example, a method is proposed in Japanese Unexamined Patent Publication No. 53-23390 wherein copolymerization of an unsaturated nitrile with a conjugated diene is carried out by using a combination of an alkyl mercaptan with a dialkyl-xanthogen disulfide as a molecular weight modifier, and by adding 20 to 70% of the unsaturated nitrile in the course of polymerization.

The method of incorporating a liquid polymer or a plasticizer and the method of suppressing the production of a high-molecular-weight fraction are effective for improving processability, but have a problem such that the vulcanizate has a poor tenacity. This problem is conspicuous especially in the field of injection molding for which high-temperature and high-rate vulcanization is carried out.

DISCLOSURE OF INVENTION

In view of the foregoing, an object of the present invention is to provide an unsaturated nitrile-conjugated diene copolymer exhibiting a high-rate vulcanizability which is required for injection molding and further exhibiting a good processability, and giving a vulcanizate having a high mechanical strength.

Another method of the present invention is to provide a process for producing the above-mentioned copolymer with a high productivity.

Still another object of the present invention is to provide a vulcanizable rubber composition having an enhanced high-temperature and high-rate vulcanizability and a good processability, and giving a vulcanizate having a high mechanical strength.

In one aspect of the present invention, there is provided an unsaturated nitrile-conjugated diene copolymer having at least 0.03 mole, per 100 moles of the monomeric units constituting the copolymer molecule, of an alkylthio group with 12 to 16 carbon atoms, which include at least three tertiary carbon atoms, and a further with a sulfur atom directly bound to at least one of the tertiary carbon atoms; said copolymer having a Mooney viscosity of 15 to 150 and containing 3 to 20% by weight of a low-molecular-weight fraction having a number average molecular weight of not larger than 35,000.

In another aspect of the present invention, there is provided a process for producing the above-mentioned unsaturated nitrile-conjugated diene copolymer wherein an unsaturated nitrile and a conjugated diene are copolymerized in the presence of a molecular weight modifier and a free-radical initiator, characterized in that the molecular weight modifier used is an alkylthiol compound with 12 to 16 carbon atoms, which include at least three tertiary carbon atoms, and further with a sulfur atom directly bound to at least one of the tertiary carbon atoms, and further in that 10 to 95% of the entire amount of the molecular weight modifier is incorporated in a monomer mixture before copolymerization, and, when the polymerization conversion reaches a value of 20 to 70%, the remainder of the molecular weight modifier is incorporated in a polymerization mixture.

In still another aspect of the present invention, there is provided a vulcanizable rubber composition comprising 100 parts by weight of the above-mentioned unsaturated nitrile-conjugated diene copolymer and 0.01 to 10 parts by weight of a sulfur-containing vulcanizer.

BEST MODE FOR CARRYING OUT THE INVENTION

Figure 1:
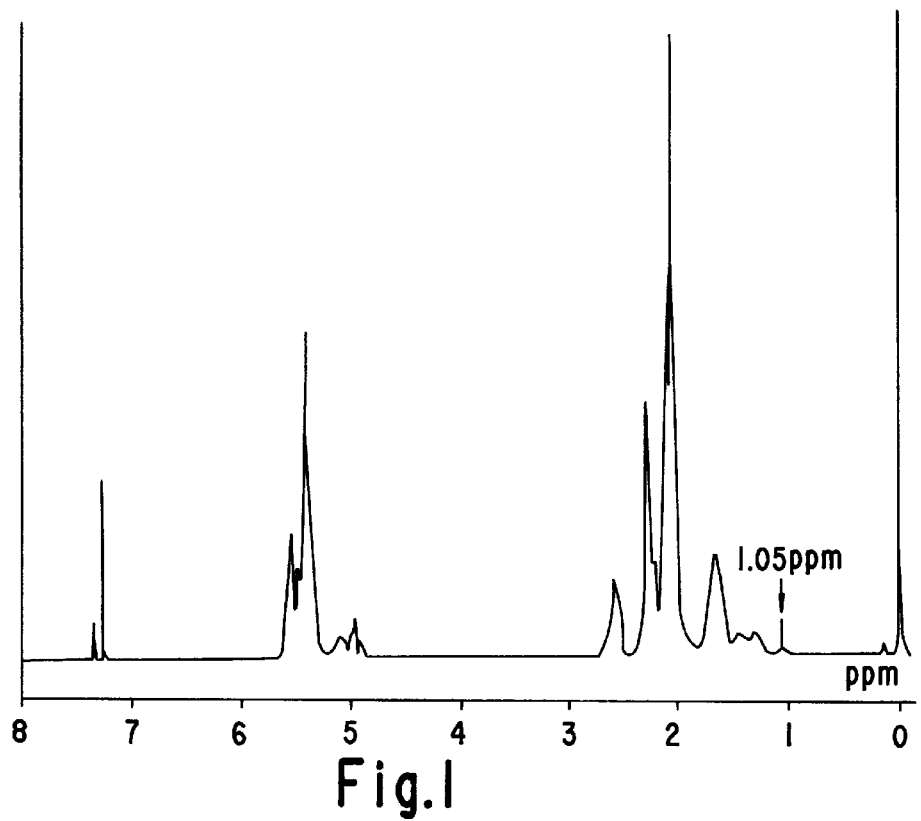
FIG. 1 is a chart of $^1$H-NMR determination of the unsaturated nitrile-conjugated diene copolymer of the present invention prepared in Example 5, hereinafter described.

The unsaturated nitrile-conjugated diene copolymer of the present invention is a unsaturated nitrile-conjugated diene copolymer rubber having an alkylthio group with 12 to 16 carbon atoms, which include at least three tertiary carbon atoms, and further with a sulfur atom which is directly bound to at least one of the tertiary carbon atoms. The unsaturated nitrile-conjugated diene copolymer rubber has a Mooney viscosity of 15 to 150, preferably 20 to 90, and contains 3 to 20% by weight, preferably 5 to 15% by weight, of a low-molecular-weight fraction having a number average molecular weight of not higher than 35,000. If the Mooney viscosity if smaller than 15, a molded article made therefrom has a poor tenacity and, when a rubber composition thereof is injection-molded, a considerable number of burrs are undesirably produced. In contrast, if the Mooney viscosity is larger than 150, the viscosity is increased and injection molding and other molding become difficult to conduct. If the fraction having a number average molecular weight (Mn) of not larger than 35,000 is too large, the mechanical strength is reduced. In contrast, the low-molecular-weight fraction is too large, the processability becomes poor.

The ratio(Mw/Mn) of the weight average molecular weight (Mw) of the unsaturated nitrile-conjugated diene copolymer to the number average molecular weight (Mn) thereof is usually in the range of 2.3 to 5.5, preferably 2.7 to 4. If the ratio (Mw/Mn) is too large, the processability is poor even though the content of the fraction having an Mn not larger than 35,000 is adequate.

The unsaturated nitrile-conjugated diene copolymer preferably contains 10 to 60% by weight of bound unsaturated nitrile units. A more preferable content is 20 to 50% by weight. The breadth (ΔAN) of compositional distribution of the unsaturated nitrile is preferably in the range of 3 to 20, more preferably 5 to 15. When the breadth (ΔAN) is in this range, a vulcanized rubber having good and balanced oil resistance and cold resistance can be obtained.

As specific examples of the unsaturated nitrile, there can be mentioned acrylonitrile, methacrylonitrile and α-chloroacrylonitrile. As specific examples of the conjugated diene, there can be mentioned 1,3-butadiene, 2,3-dimethylbutadiene, isoprene and 1,3-pentadiene.

Provided that the object of the present invention is not defeated, part of the unsaturated nitrile and the conjugated diene can be substituted by other copolymerizable monomers. As specific examples of the copolymerizable monomers, there can be mentioned vinyl monomers such as styrene, α-methylstyrene and vinylpyridine; non-conjugated diene monomers such as vinylnorbornene, dicyclopentadiene and 1,4-hexadiene; unsaturated carboxylic acid monomers such as acrylic acid and methacrylic acid; unsaturated carboxylic acid ester monomers such as methyl acrylate, ethyl acrylate, ethyl acrylate, ethyl methacrylate, propyl acrylate, propyl methacrylate, butyl acrylate, butyl methacrylate, hexyl acrylate, hexyl methacrylate, cyclohexyl acrylate, cyclohexyl methacrylate, lauryl acrylate and lauryl methylacrylate; and polyethylene glycol acrylate, polyethylene glycol methacrylate, polypropylene glycol acrylate, polypropylene glycol methacrylate, epoxy acrylate, epoxy methacrylate, urethane acrylate and urethane methacrylate. These copolymerizable monomers are usually used in an amount of not larger than 10% by weight.

Of the unsaturated nitrile-conjugated diene copolymer rubbers, an acrylonitrile-butadiene copolymer rubber (hereinafter abbreviated to "NBR") having a bound acrylonitrile content of 10 to 60% by weight, especially 20 to 50% by weight, is preferable. Commercially available NBR having a wide variety of bound acrylonitrile contents can be used and NBR having the most adequate bound acrylonitrile content should be chosen depending upon the particular properties desired.

As the alkylthio group having 12 to 16 carbon atoms, which include at least three tertiary carbon atoms, and having a sulfur atom which is directly bound to at least one of the tertiary carbon atoms, there can be mentioned a 1,1-di(2,2-dimethylpropyl)-1-ethylthio group and a 1-(2,2-dimethylpropyl)-1-(tetramethylpentyl)-1-ethylthio group. These alkylthio groups may be present alone or in combination within the molecule of the copolymer rubber. Of these, a 1,1-di(2,2-dimethylpropyl)-1-ethylthio group is preferable.

The amount of the alkylthio group present in the unsaturated nitrile-conjugated diene copolymer of the present invention is usually at least 0.03 mole, preferably at least 0.07 mole and more preferably at least 0.09 mole, per 100 moles of the total monomer units in the copolymer. The upper limit of the alkylthio group is usually 0.3 mole. If the amount of the alkylthio group is too small, when it is vulcanized at a high temperature for a short time, e.g., at the step of injection molding, a high crosslinking efficiency cannot be obtained and thus the tensile stress and impact resilience cannot be obtained. Namely the intended high rate of vulcanization cannot be effected. As an increase in the amount of the alkylthio group, the scorch time ($T_5$) is markedly shortened and the contamination of a mold is mitigated, and thus, the productivity in injection molding is enhanced. Especially when the content of the alkylthio group is at least 0.09 mole, the crosslinking efficiency is markedly improved, and the maximum torque in a vulcanization curve as obtained by measurement using an oscillating disc rheometer is drastically increased.

The unsaturated nitrile-conjugated diene copolymer of the present invention is produced by a process wherein an unsaturated nitrile and a conjugated diene are radically copolymerized in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms; and the molecular weight modifier is added in lots in the course of polymerization.

Alternatively, instead of the method wherein the molecular weight modifier is added in lots in the course of polymerization, a method can be employed wherein at least two copolymers having different molecular weights are prepared separately by using the molecular weight modifier, and these copolymers are mixed together.

The free radical initiator used is not particularly limited. Usually organic peroxides, redox polymerization initiators, azo compounds and persulfates are used. These polymerization initiators are usually used in an amount of 0.005 to 3 parts by weight per 100 parts by weight of the monomers. The polymerization temperature is preferably in the range of 0° to 100° C.

As specific examples of the alkylthiol compound used as a molecular weight modifier for the production of the unsaturated nitrile-conjugated diene copolymer of the present invention, there can be mentioned 2,2',4,6,6'-pentamethylheptane-4-thiol and 2,2',4,6,6',8,8'-heptamethylnonane-4-thiol. Of these, 2,2',4,6,6'-pentamethylheptane-4-thiol is preferable. An unsaturated nitrile-conjugated diene copolymer made from the unsaturated nitrile-conjugated diene copolymer made by using this alkylthiol compound exhibits excellent efficiency in high-rate vulcanization.

The alkylthiol compound as a molecular weight modifier can be used either alone or in combination. If desired, the alkylthiol compound can be used in combination with another molecular weight modifier which is conventionally used in a radical polymerization. In this case, the alkylthiol compound should be used in an amount of at least 50% weight, preferably at least 80% by weight, and more preferably at least 95% by weight, based on the total weight of the molecular weight modifiers.

As the molecular weight modifier which may be used in combination with the above-mentioned alkylthiol compound, there can be mentioned, for example, alkylthiol compounds such as 2,4,4-trimethylpentane-2-thiol, dodecane-12-thiol, 2,2,6,6-tetramethylheptane-4-methanethiol and 2,4,6-trimethylnonane-4-thiol; xanthogendisulfides such as dimethyl xanthogendisulfide, diethyl xanthogendisulfide and diisopropyl xanthogendisulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; and acrolein, methacrolein, allyl alcohol, 2-ethylhexyl thioglycolate, terpinolene, α-terpinene, γ-terpinene, dipentene, α-methylstyrene dimer (which preferably contains at least 50% by weight of 2,4-diphenyl-4-methyl-1-pentene), 2,5-dihydrofuran, 3,6-dihydro-2H-pin, phthalan, 1,2-butadiene and 1,4-hexadiene.

The amount of the molecular weight modifier used for radical polymerization is usually 0.05 to 3 parts by weight, preferably 0.1 to 1 part by weight, based on 100 parts by weight of the monomer mixture for compolymerization. This amount is advantageous for desirably controlling the molecular weight of the copolymer.

The molecular weight modifier is used in a manner such that 10 to 95% by weight of the entire amount thereof used in incorporated in a monomer mixture before the commencement of polymerization and, when the conversion reaches 20 to 70%, the remainder of the molecular weight modifier is added to the polymerization mixture. The number of divided lots can be appropriately determined according to the need.

By using the above-mentioned alkylthiol molecular weight modifier in the production of the unsaturated nitrile-conjugated diene copolymer of the present invention, the conversion in radical polymerization can be enhanced to at least 75%, preferably at least 80%. Thus the copolymer rubber can be produced at a high productivity.

In a radical polymerization for the production of nitrile rubbers, a branch-forming reaction of gelation generally becomes marked with an increase of the polymerization conversion. Where the resulting nitrile rubber is vulcanized, a high vulcanization efficiency cannot be obtained and the vulcanizate has poor physical properties such as tensile stress and impact resilience. t-Dodecyl mercaptan which is conventionally used as a molecular weight modifier in a radical polymerization for nitrile rubbers is a mixture of alkylthiol compound isomers having 9 to 16 carbon atoms. Where this mixture is used as a molecular weight modifier, the resulting nitrile rubbers are difficult to vulcanize at a high rate when they are subjected to a high-temperature and short-time vulcanizaton, for example, when injection-molded.

In contrast, in the process for producing the unsaturated nitrile-conjugated diene copolymer of the present invention, even when the polymerization conversion is high, e.g., 80% or higher, the resulting nitrile rubber can be vulcanized at a high rate, and thus, the maximum torque in a vulcanization curve as obtained by measurement using an oscillating disc rheometer is high.

Instead of charging the entire amount of the monomers in a reactor before commencement of polymerization, 30 to 90% by weight of the entire amount of the monomers can be charged before the commencement of polymerization and, when the polymerization conversion reaches 20 to 50% by weight, the remainder monomers can be added to a polymerization mixture. The unsaturated nitrile-conjugated diene copolymer made by this divided monomer addition method is characterized as exhibiting a breadth ($\Delta$AN) of compositional distribution of the unsaturated nitrile in the range of 3 to 20. The copolymer having such $\Delta$AN value gives a vulcanized rubber exhibiting good and balanced oil resistance and cold resistance.

The kind and amount of monomers added in lots can be appropriately varied depending upon the intended content of bound unsaturated nitrile in the copolymer and the breadth ($\Delta$AN) of compositional distribution of unsaturated nitrile. For example, where a bound nitrile content of smaller than 37% is intended, part of the unsaturated nitrile is usually added to the reaction mixture during polymerization. Where a bound nitrile content of at least 37% is intended, part of the conjugated diene is usually added to the reaction mixture during polymerization. The number of monomer addition can be appropriately determined according to the need.

The procedure by which the radical polymerization is effected is not particularly limited, and an appropriate procedure can be chosen from bulk polymerization, solution polymerization, suspension polymerization and emulsion polymerization. Of these, emulsion polymerization is preferable.

Where the unsaturated nitrile-conjugated diene copolymer is produced by an emulsion polymerization procedure, if a carboxylic acid type emulsifier is used, a problem of mold contamination does not arise at a high-temperature and short-time vulcanization such as injection molding.

The carboxylic acid type emulsifier used includes, for example, fatty acid soap and rosin soap. As specific examples of the carboxylic acid type emulsifier, there can be mentioned fatty acid soap such as a sodium salt or a potassium salt of long-chain aliphatic carboxylic acids having 12 to 18 carbon atoms, for example, lauric acid, myristic acid, palmitic acid, stearic acid, oleic acid and mixtures thereof; and rosin soap such as a sodium salt or a potassium salt of a disporportionated or hydrogenated product of natural rosin such as gum rosin, wood rosin or tall oil rosin. The natural rosin contains as main ingredients abietic acid, levopimaric acid, palustric acid, dehydroabietic acid, tetrahydroabietic acid and neoabietic acid. The amount of the emulsifier is not particularly limited, but is usually in the range of 0.05 to 10 parts by weight, preferably 0.5 to 3 parts by weight, per 100 parts by weight of the monomers.

The emulsion polymerization for the unsaturated nitrile-conjugated diene copolymer can be carried out by a conventional procedure, and when the predetermined conversion is reached, polymerization is terminated by adding a radical chain terminator such as hydroxylamine or sodium carbamate.

The radical chain terminator used is not particularly limited, and any conventional radical chain terminator can be used which includes, for example, hydroxylamine and sodium dimethyldithiocarbamate.

In the preparation of the copolymer of the present invention, radical chain terminators which do not produce nitrosoamine or produce nitrosoamine only to a light extent, and which have recently attracted attention, can be advantageously used.

Radical chain terminators having an amine structure have heretofore been used for radical polymerization for the production of unsaturated nitrile-conjugated diene copolymers. However, these radical chain terminators have been proved to produce nitrosoamine which is known as giving cancer. To cope with this problem, there have been proposed an aromatic hydroxydithiocarboxylic acid chain terminator having no amine structure, and a chain terminator such as diethylhydroxylamine which has an amine structure, but is believed to produce nitrosoamine only to a negligible amount (see, for example, Japanese Unexamined Patent Publication No. 2-242802). Although these chain terminators do not have a problem of producing nitrosoamine, new problems have arisen in that, when the copolymer rubber is vulcanized with a sulfur-containing vulcanizer, the rate of vulcanization is reduced, and the mechanical strength of a vulcanizate is low.

In contrast to the production of the conventional unsaturated nitrile-conjugated diene copolymer, it would be surprising that, even when the unsaturated nitrile-conjugated diene copolymer of the present invention is produced by using a chain terminator having no amine structure or a chain terminator having an amine structure but being believed to produce nitrosoamine only to a negligible amount, a copolymer rubber can be obtained which exhibits a high-rate vulcanizability when vulcanized with sulfur, and gives a vulcanizate having high mechanical strength.

As specific examples of the radical chain terminator which has an amine structure but is believed to produce nitrosoamine only to a negligible amount, there can be mentioned diethylhydroxylamine, hydroxylaminesulfonic acid and alkali metal salts thereof, and hydroxylamine sulfate. As specific examples of the radical chain terminator having no amine structure, there can be mentioned aromatic hydroxy-dithiocarboxylic acids and alkali metal salts thereof, such as hydroxydimethylbenzene-dithiocarboxylic acid, hydroxydiethylbenzene-dithiocarboxylic acid and hydroxydibutylbenzene-dithiocarboxylic acid, and alkali metal salts thereof; hydroquinone derivatives and catechol derivatives. These radical chain terminators can be used either alone or in combination.

The amount of the radical chain terminator is not particularly limited, but is usually 0.1 to 10 parts by weight based on 100 parts by weight of the total monomers.

After the termination of polymerization, unreacted monomers are removed, for example, by heating or steam distillation, and then, a coagulant is added whereby the copolymer is coagulated and recovered. The coagulant used includes those which are used in ordinary emulsion polymerization. As examples of the coagulant, there can be mentioned inorganic coagulants such as calcium chloride and aluminum chloride, high polymer coagulants and heat-sensitive coagulants. The recovered copolymer is washed with water and dried to give the intended copolymer.

It is preferable that a nonionic surface active agent is incorporated in the copolymer latex as prepared in the above-mentioned manner, and then, the copolymer latex is introduced in a coagulating bath having a metal salt dissolved therein, but being substantially free from halogen, and is heated whereby a unsaturated nitrile-conjugated diene copolymer which is substantially free from halogen can be obtained. The term "substantially free from halogen" used herein means that the content of halogens in the copolymer is zero or not larger than 3 ppm.

By adopting this coagulating method, crumbs can easily be obtained which have appropriate size and porosity and are capable of being easily dried. Further, by the addition of a nonionic surface active agent, the amount of a metal salt for coagulation can be reduced. The thus-produced unsaturated nitrile-conjugated diene copolymer is substantially free from halogen and gives a vulcanizate which does not cause a problem of metal corrosion, for example, when the vulcanizate is used as a sealing material placed in contact with a metal, and which has good mechanical strength.

As specific examples of the nonionic surface active agent incorporated in the copolymer latex, there can be mentioned an adduct of an alkylene oxide with an alkyl-phenol-formaldehyde condensate (for example, an oxyethylene-oxypropylene co-addition product), a polyoxyethylene alkyl ether, a polyoxyethylene alkyl-aryl ether, a polyoxyethylene fatty acid ester, a polyoxyethylene sorbitan fatty acid ester, a polyoxyethylene-oxypropylene block copolymer, an alkyl-sulfinyl alcohol and a fatty acid monoglyceride. These nonionic surface active agents can be used either alone or in combination, depending upon the particular coagulating conditions.

Of these nonionic surface active agents, an oxyethylene-oxypropylene co-addition produce of an alkylphenol-formaldehyde condensate is preferable. This co-addition product exhibits a good heat-sensitive gel effect. The co-addition product preferably has a cloud point of 10° to 100° C., more preferably 20° to 70° C. If the cloud point is too low, the handling property is not satisfactory. If the cloud point is too high, the heat sensitive gel effect becomes poor.

The amount of the nonionic surface active agent is preferably 0.01 to 5 parts by weight, more preferably 0.05 to 2 parts by weight, based on 100 parts by weight of the copolymer. When the amount is too small, the above-mentioned benefits cannot be obtained. Even when the amount exceeds 5% by weight, there is no substantial increase in the above-mentioned benefits.

As the metal salt to be incorporated in the coagulating bath, those which are free from nitrogen are used. As examples of the halogen-free metal salt, there can be mentioned metal sulfates such as aluminum sulfate, magnesium sulfate and sodium sulfate. Of these, aluminum sulfate and magnesium sulfate are preferable.

The amount of the metal salt is preferably in the range of 0.5 to 50 parts by weight, more preferably 1 to 30 parts by weight, based on 100 parts by weight of the copolymer. If the amount of the metal is smaller than 0.5 part by weight, coagulation in a coagulating bath is insufficient and undesirably large crumbs are formed. If the amount of the metal salt is larger than 50 parts by weight, the rate of coagulation varies greatly depending upon the particular metal salt and the crumbs have a poor porosity.

When the coagulating bath having the copolymer latex introduced therein is heated to the cloud point of the nonionic surface active agent or higher, the copolymer latex coagulates. The nonionic surface active agent used preferably has a cloud point of 10° to 100° C. If the cloud point is too low, cooling is required for keeping the latex-incorporated coagulating bath below the cloud point. If the cloud point is too high, the latex-incorporated coagulating bath must be heated to a high temperature for coagulation.

The coagulated copolymer is recovered, washed with water and dried to give the intended unsaturated nitrile-conjugated diene copolymer.

A sulfur-containing vulcanizer is incorporated in the unsaturated nitrile-conjugated diene copolymer of the present invention to provide a vulcanizable rubber composition having an excellent high-rate vulcanizability. As specific examples of the sulfur-containing vulcanizer, there can be mentioned sulfur such as powdered sulfur, flower of sulfur, precipitated sulfur, colloidal sulfur, surface-treated sulfur and insoluble sulfur, and sulfur-containing compounds such as sulfur chloride, sulfur dichloride, morphorine disulfide, an alkylphenol disulfide, N,N'-dithio-bis (hexahydro-2H-azepinon-2), sulfur-containing polysulfide and high-molecular weight polysulfide. Further, sulfur-containing vulcanization promoters such as tetramethylthiuram disulfide, selenium dimethyl dithio-carbamate and 2-(4'-morphorinodithio)benzothiazole are included.

In combination with the sulfur-containing vulcanizer, a vulcanization promoter can be used which includes, for example, zinc white or stearic acid; or a guanidine, aldehyde-amine, aldehyde-ammonia, thiazole, sulfenamide, thiourea and xanthate promoter.

The amount of the sulfur-containing vulcanizer is not particularly limited, but is usually in the range of 0.10 to 10 parts by weight, preferably 0.1 to 5 parts by weight, per 100 parts by weight of the unsaturated nitrile-conjugated diene copolymer. If the sulfur-containing vulcanizer is not incorporated in the rubber composition, a high-rate vulcanization cannot be effected when cured at a high-temperature for a short time. However, vulcanizers other than the sulfur-containing vulcanizer, such as a peroxide vulcanizer, may be suitably used in combination with the sulfur-containing vulcanizer.

As the organic peroxide vulcanizer used in combination with the sulfur-containing vulcanizer, there can be mentioned, for example, tert-butyl hydroperoxide, cumene hydroperoxide, di-tert-butyl peroxide, tert-butylcumyl peroxide, 2,5-dimethyl-tert-butyl peroxyhexane, 2,5-dimethyl-tert-butyl peroxyhexyne, 1,3-bis(tert-butyl peroxyisopropyl)benzene, p-chlorbenzoyl peroxide, tert-butyl peroxybenzoate, tert-butyl peroxyisopropylcarbonate and tert-butyl benzoate.

As other vulcanizers which can also be used in combination with the sulfur-containing vulcanizer, there can be mentioned polyfunctional compounds such as trimethylolpropane trimethacrylate, divinylbenzene, ethylene dimethacrylate and triallyl isocyanurate. Further, there can be mentioned a metallic soap/sulfuric vulcanizer, a triazone/dithiocarbamate vulcanizer, a polycarboxylic acid/onium salt vulcanizer, a polyamine vulcanizer such as hexamethylenediamine, triethylenetetramine, hexamethylenediamine carbamate, ethylenediamine carbamate or triethylenediamine, and an ammonium benzoate vulcanizer.

In the rubber composition or the present invention, auxiliaries which are conventionally used in rubber compositions can be incorporated according to the need. Such auxiliaries include, for example, reinforcing materials such as various types of carbon black, silica and talc, fillers such as calcium carbonate and clay, processing aids, processing oils including plasticizers, antioxidants, and antiozonants.

Various thermoplastic resins can be incorporated in the vulcanizable rubber composition of the present invention. Among thermoplastic resins, a vinyl chloride resin is especially noteworthy.

NBR has a poor weather resistance. To impart a good weather resistance to NBR, a vinyl chloride resin is incorporated in NBR composition. However, the vinyl chloride resin-incorporated NBR has a poor high-rate vulcanizability with sulfur, and the vulcanizate has poor mechanical strength and large compression set. In contrast, the vulcanizable rubber composition of the present invention having incorporated therein a vinyl chloride resin exhibits a good high-rate vulcanizability and gives a vulcanizate having a high mechanical strength and a low compression set, as well as good weather resistance.

The vinyl chloride resin used is not particularly limited, but usually those which have an average molecular weight of 600 to 2,000 are used.

The mixing ratio of the vinyl chloride resin and the unsaturated nitrile-conjugated diene copolymer is usually such that the amount of the copolymer is 95 to 50 parts by weight, preferably 80 to 60 parts by weight, and the amount of the vinyl chloride resin is 5 to 50 parts by weight, preferably 20 to 40 parts by weight, based on the total weight of the copolymer rubber and the vinyl chloride resin. Especially a blend composed of about 70 parts by weight of an acrylonitrile-butadiene copolymer rubber and about 30 parts by weight of a vinyl chloride resin is most preferable.

The procedure by which the unsaturated nitrile-conjugated diene copolymer and the vinyl chloride resin are mixed together is not particularly limited. Usually there are adopted a dry blending method wherein a powdery vinyl chloride resin and a powdery unsaturated nitrile-conjugated diene copolymer are mixed together at a high temperature, for example, by a Banbury mixer, and a co-precipitating method wherein a latex of the unsaturated nitrile-conjugated diene copolymer and a latex of the vinyl chloride resin are mixed together, the mixture is coagulated, and the thus-formed precipitate is dried and then heat-treated, for example, by an extruder or a Banbury mixer.

As reinforcing fillers to be incorporated in the rubber composition of the present invention, non-black reinforcing fillers are especially preferable. Heretofore, carbon black has been widely used as the best reinforcing filler for conventional NBR. When non-black reinforcing fillers are incorporated in conventional NBR, the reinforcing effect is not manifested or is manifested only to a slight extent. However, when non-black reinforcing fillers are incorporated in the rubber composition of the present invention, a reinforcing effect of a high level is manifested.

The term "non-black reinforcing filler" used herein means an inorganic filler which exhibits a reinforcing effect when incorporated in an unsaturated nitrile-conjugated diene copolymer, and which has a non-black color. As the non-black reinforcing fillers, there can be mentioned those which are generally used as reinforcers for synthetic rubbers and are other than carbon black. Usually the non-reinforcing fillers are used in white or light-colored rubber compositions.

As specific examples of the non-black reinforcing fillers, there can be mentioned silica such as white carbon, dry process silica, wet process silica, synthetic silicate and colloidal silica; activated calcium carbonate, special calcium carbonate and basic magnesium carbonate; ultrafine magnesium silicate, and hard clay. Further, among those which are known as fillers, fillers having a reinforcing effect such as ground whiting, talc, diatomaceous earth and alumina can also be used. Of these non-black reinforcing fillers, white carbon, basic magnesium carbonate, activated calcium carbonate and ultrafine magnesium silicate are preferable.

The amount of the non-black reinforcing filler used is usually in the range of 10 to 500 parts by weight, preferably 30 to 200 parts by weight, based on 100 parts by weight of the unsaturated nitrile-conjugated diene copolymer.

If desired, other rubbers can be incorporated in combination with the unsaturated nitrile-conjugated diene copolymer in the rubber composition of the present invention, which include, for example, an acrylic rubber, a fluororubber, a styrene-butadiene copolymer rubber, an ethylene-propylene-diene terpolymer rubber (EPDM), natural rubber and a polyisoprene rubber.

The procedure by which the rubber composition of the present invention is made is not particularly limited, but usually the vulcanizable rubber, a vulcanizing system and other auxiliaries are mixed and kneaded together by using a conventional roll, Banbury mixer or other mixer.

The invention will now be described specifically by the following examples. Parts and % in the following examples, comparative examples and reference examples are by weight unless otherwise specified.

Characteristics of copolymers, vulcanizable rubber compositions and rubber vulcanizates were determined as follows.

(1) Properties of copolymers (i) Bound nitrile content (weight %)

Bound nitrile content was determined by measuring the content of nitrogen in a copolymer by the Kjeldahl method according to JIS K6384, and calculating the bound nitrile content from the nitrogen content.

(ii) Mooney viscosity

Measurement was carried out at 100° C. on about 40 g of a copolymer sample according to JIS K6383.

(iii) Molecular weight and molecular weight distribution

Number average molecular weight (Mn) and weight average molecular weight (Mw) of a copolymer were determined by measuring by gel permeation chromatography using tetrahydrofuran as a solvent and correcting in terms of those of standard polystyrene.

The proportion (%) of a fraction having a number average molecular weight (Mn) not larger than 35,000 to the total weight of the copolymer was calculated as the ratio (%) of the area of said fraction to the entire area of the molecular weight distribution.

(iv) Breadth ($\Delta$AN) of compositional distribution of unsaturated nitrile

Determination of AN was made on an unsaturated nitrile-conjugated diene copolymer by using a high-speed liquid chromatography. The method of determination is described in Rubber Chemistry and Technology, vol. 63, [2], p181–191 (1990). Namely, chromatogram was prepared by a high-speed chromatography under the following conditions. $\Delta$AN was the half-value width of the chromatogram. For the determination of $\Delta$AN, a calibration chart showing the relationship of the amount of eluate with the amount of unsaturated nitrile was prepared by using a copolymer sample containing a known amount of unsaturated nitrile.

(a) Column

Gel: crosslinked 2-chloroacrylonitrile/ethylene dimethacrylate copolymer

Diameter of gel particles: 2 to 6 $\mu$m

Column: made of stainless steel

Column diameter×length: 0.46 cm×25 cm (b) Eluting solution

At the initial chloroform/n-hexane ratio (30/70 by weight), the eluting solution was allowed to flow for 20 minutes and then, eluated from 30/70 to 100/0 in a gradient manner over a period of 30 minutes.

(c) Rate of flow: 0.5 ml/min.

(d) Concentration of sample: 1 wt. % in chloroform (e) Injection amount: 10 to 20 $\mu$l (f) Detector: light scattering mass detector Model 750/14 made by ACS Co.

(g) Instrument: Trirotor VI made by Nippon Bunko K.K.

(v) Concentration (% by mole) of a 1,1-di(2,2-dimethylpropyl)-1-ethylthio group

Concentration of the ethylthio group in a copolymer was determined as follows. The copolymer was dissolved in benzene, and then coagulated in methyl alcohol. This operation of dissolution and coagulation was repeated three times, and then the copolymer was purified. The purified copolymer was subject to the measurement by NMR as follows.

By measurement using $^1$H-NMR (400 MHz), a peak due to a proton of the terminal methyl group in the 1,1-di(2,2-dimethylpropyl)-1-ethylthio group was detected in the vicinity of 1.05 ppm. By measurement using $^{13}$C-NMR (100 MHz), a peak due to the C atom of —CH$_2$— group in said ethylthio group was detected in the vicinity of 54.6 ppm.

The concentration of the ethylthio group in copolymer was determined by calculation from the ratio (A/B) (in mole %) of (A) an integrated value of a peak due to the terminal methyl group as detected by $^1$H-NMR measurement to (B) an integrated value of a peak detected in the vicinity of 4.8 to 5.8 ppm due to a proton bound to an unsaturation of butadiene.

(vi) Concentration of residual chlorine in copolymer

A copolymer was placed in a vessel having water incorporated therein. The vessel was closed, and the content was boiled at 120° C. for 24 hours to extract soluble ingredients. The resulting aqueous liquid was concentrated and the concentration of chlorine (in ppm) was measured by ion chromatography.

(vii) Concentration of nitrosoamine in copolymer

A copolymer was subjected to Soxhlet extraction according to the method of Society of Rubber Industry, Germany (DIK). The liquid was concentrated, and then the concentration of nitrosoamine (in ppm) was measured by a gas chromatographic thermal energy analyze (GC-TEA).

(2) Properties of unvulcanized rubber composition (i) High-rate vulcanizability

Unvulcanized rubber compositions were prepared according to recipe A shown in Table 1 or recipe B shown in Table 2. Where the unvulcanized rubber composition contained a vinyl chloride resin, the composition was prepared according to recipe C shown in Table 3. Where the unvulcanized rubber composition contained a non-black reinforcing filler, the composition was prepared according to recipe A shown in Table 1 and the amount of a non-black reinforcing filler shown in Table 9 was added.

Using 10 g of each vulcanizable rubber composition, the scorch time (T$_5$ in minute) and the maximum torque (V$_{max}$ in kgf·cm) at a temperature of 160° C. were determined by an oscillating disc rheometer according to the Society of Rubber Industrial Japan Standard SRIS 3102. The smaller the $T_5$ value, the higher the rate of vulcanization. The larger the $V_{max}$ value, the larger the crosslinking efficiency.

TABLE 1

(Recipe A)

| Ingredients | Amount (parts by weight) |
| --- | --- |
| Copolymer | 100 |
| Zinc oxide | 5 |
| Stearic acid | 1 |
| Sulfur (325 mesh) | 0.5 |
| SRF carbon black | 60 |
| Dioctyl phthalate | 5 |
| Tetramethylthiuram disulfide *1 | 1.5 |
| N-cyclohexyl-2-benzothiazyl-sulfenamide *1 | 1.5 |

*1 Vulcanization promotor

TABLE 2

(Recipe B)

| Ingredients | Amount (parts by weight) |
| --- | --- |
| Copolymer | 100 |
| Zinc oxide | 5 |
| Stearic acid | 5 |
| Sulfur (325 mesh) | 1 |
| SRF carbon black | 0.5 |
| Dioctyl phthalate | 60 |
| Tetramethylthiuram disulfide *1 | 1.5 |
| N-cyclohexyl-2-benzothiazyl-sulfenamide *1 | 1.5 |

*1 Vulcanization promotor

TABLE 1

(Recipe C)

| Ingredients | Amount (parts by weight) |
| --- | --- |
| Copolymer | 100 |
| Zinc oxide | 5 |
| Stearic acid | 1 |
| Sulfur (325 mesh) | 0.5 |
| SRF carbon black | 60 |
| Dioctyl phthalate | 20 |
| Tetramethylthiuram disulfide *1 | 1.5 |
| N-cyclohexyl-2-benzothiazyl-sulfenamide *1 | 1.5 |
| Octylated diphenylamine *2 | 1 |

*1 Vulcanization promotor
*2 Aging stabilizer (ii) Contamination of mold

An vulcanized rubber composition was prepared according to recipe A shown in Table 1, receipe B shown in Table 2 or receipe C shown in Table 3, and the rubber composition was filled in a hole with a diameter of 12 mm of a metal plate having a thickness of 2 mm. The rubber composition-filled metal plate was sandwiched between two mild steel sheets (JIS G3141) each having a thickness of 1 mm. Then the rubber composition in the sandwiched metal plate was vulcanized at a temperature of 220° C. and a pressure of 20 kg/cm² for 2 minutes. The vulcanized rubber composition was removed and then an unvulcanized rubber composition was again filled in the hole of the metal plate, followed by vulcanization. This operation of removal of a vulcanized rubber composition, and filling and vulcanization of an unvulcanized rubber composition was repeated 50 times, and the contamination of the contact surface of each mild steel sheet was evaluated.

The degree of contamination was expressed by five ratings. Rating 1 means that there was no contamination on the mild steel sheets, and rating 5 means that the entire contact surface of each mild steel sheet was contaminated to the greatest extent.

(iii) Processability

An unvulcanized rubber composition was extruded by using a Garvey die according to ASTM D-2230-77 to determine the die swell (%) and the extrusion rate (g/min). Further, the configuration and state of the rubber extrudate was evaluated on the degree of porosity and degree of swelling, and the edge portion, surface and corner portion thereof. The evaluation results were expressed by five ratings. Rating 5 and rating 1 means the best and worst configuration and state, respectively.

(3) Properties of rubber vulcanizate (i) Tensile strength (kgf/cm²)

According to Japanese Industrial Standard (JIS) K6301, an unvulcanized rubber formulation prepared according to recipe A shown in Table 1, recipe B shown in Table 2 or recipe C shown in Table 3 was vulcanized at a temperature of 160° C. for 20 minutes to give a sheet having a thickness of 2 mm. A #3 dumbbell specimen was cut out from the sheet, and the tensile strength was measured.

(ii) Elongation at Break (%)

Elongation was measured on a specimen prepared by the same procedure as that for the determination of tensile strength.

(iii) Tensile Stress at 100% Elongation (kgf/cm²)

Tensile stress at 100% elongation was measured on a specimen prepared by the same procedure as that for the determination of tensile strength.

(iv) Hardness (JIS)

Hardness was measured by using a JIS spring-type A hardness tester.

(v) Impact Resilience (%)

Impact resilience was measured according to JIS K6301.

(vi) Compression Set (%)

Compression set was measured according to JIS K6301 after the specimen was maintained at a temperature of 120° C. for 22 hours.

(vii) Oil Resistance (Volume Change in %)

Oil resistance was evaluated according to JIS K6301 by the volume change (%) as measured after immersion of the specimen in a #3 lubricating oil having a kinetic viscosity of 31.9 to 34.1, an aniline point of 68.5° to 70.5° C. and a flash point of 162.7 at a temperature of 120° C. for 72 hours.

With regard to the rubber vulcanizate having a vinyl chloride resin incorporated therein, the specimen was immersed in Fuel C (i.e., a mixed liquid composed of 50% by volume of iso-octane and 50% by volume of toluene, instead of #3 lubricating oil) at a temperature of 40° C. for 48 hours.

(viii) Cold Resistance ($T_{10}$ in °C.)

Cold resistance was evaluated according to JIS K6301 by a Gehman tortional test method, and expressed by the temperature ($T_{10}$ in °C.) at which the tortion angle reached 10 times of the tortion angle as measured at 23° C. The lower the $T_{10}$, the better the cold resistance.

(ix) Ozone Resistance (Weather Resistance)

Ozone resistance was evaluated according to JIS K6301 by elongating 20% under static conditions at an ozone concentration of 80 ppm and a temperature of 40° C., allowing to stand for 336 hours, or by elongating 40% under static conditions at an ozone concentration of 80 ppm and a temperature of 40° C., allowing to stand for 72 hours, and thereafter, observing the state of crack formation.

(x) Metal Corrosion

Corrosion of a metal plate SAE 1020 was tested according to the General Motor (GM) method as follows. An unvulcanized rubber composition prepared according to recipe A shown in Table 1 was vulcanized by a conventional procedure to give a sheet having a thickness of 2 mm. Specimens having a size of 2 mm×5 cm×5 cm were prepared from the sheet. Each specimen was sandwiched between two metal sheets (SAE 1020, abraded with abrasive grains of 400 mesh), and a load was applied on the pile. Then the pile was placed in a thermo-hygrostat and was allowed to stand for 96 hours at a temperature of 50° C. Thereafter the specimen was taken out and the state of surface corrosion was observed. The degree of surface corrosion was expressed by six ratings spanning from 0 to 5. Rating 0 means that no corrosion was observed. Rating 5 means that the entire surface was corroded.

EXAMPLES 1–5

A reactor having an inner volume of 10 liters was charged with 2 parts of potassium oleate as an emulsifier, 0.1 part of potassium phosphate as a stabilizer and 150 parts of water, and further, butadiene, acrylonitrile and 2,2',4,6,6'-pentamethylheptane-4-thiol (hereinafter abbreviated to "PMHT") as a molecular weight modifier (the amounts of these ingredients are shown in Table 4) were added. By incorporating 0.015 part of ferrous sulfate as an activator and 0.05 part of p-methane hydroperoxide as a radical initiator, an emulsion polymerization was commenced at a temperature of 10° C.

When the conversion reached a predetermined value shown in Table 4, PMHT was additionally incorporated in the polymerization mixture, followed by continuation of polymerization. When the conversion reached a predetermined value shown in Table 4, 0.2 part of hydroxylamine sulfate per 100 parts of the monomers was added to terminate polymerization. Then the polymerization mixture was heated and subjected to a steam distillation at about 70° C. under a reduced pressure to recover residual monomers. As an aging stabilizer 2 parts of an alkylated phenol was added to obtain a copolymer latex. The polymer latex was incorporated in an aqueous solution of calcium chloride to coagulate the polymer. The thus-obtained crumbs were taken out, and washed with water and then dried at 50° C. under a reduced pressure to obtain acrylonitrile-conjugated diene copolymers I to V.

The bound acrylonitrile content, bound butadiene content and concentration of an alkylthio group in each copolymer and Mooney viscosity and other characteristics of the copolymer are shown in Table 4.

According to recipe A shown in Table 1, the copolymer rubber was kneaded together by a Banbury mixer to obtain a rubber composition. The rubber composition was subjected to press vulcanization at 160° C. for 20 minutes, and the physical properties of the vulcanizate were evaluated. The results are shown in Table 5.

COMPARATIVE EXAMPLE 1

Butadiene and acrylonitrile were copolymerized by the same procedures as employed in Example 2, except that commercially available t-dodecyl mercaptan (TDM, supplied by Phillips Petroleum Co.) was used as a molecular weight modifier instead of PMHT to obtain an acrylonitrile-butadiene copolymer VI. The properties of copolymer VI were evaluated and the results are shown in Table 4. The properties of the vulcanizate made from copolymer VI were evaluated and the results are shown in Table 5.

COMPARATIVE EXAMPLE 2

Butadiene and acrylonitrile were copolymerized by the same procedures as employed in Example 2, except that the PMHT molecular weight modifier was added at one time before polymerization instead of the divided addition, to obtain an acrylonitrile-butadiene copolymer VII. The properties of copolymer VII were evaluated and the results are shown in Table 4. The properties of the vulcanizate made from copolymer VII were evaluated and the results are shown in Table 5.

COMPARATIVE EXAMPLE 3

According to recipe B shown in Table 2, 100 parts of copolymer VII and 5 parts of liquid NBR (Nipol 1312, supplied by Nippon Zeon Co.) were mixed together, and a rubber composition was obtained therefrom. A vulcanizate was made from the rubber composition, and the properties thereof were evaluated. The evaluation results are shown in Table 5.

TABLE 4

| Copolymer | I | II | III | IV | V | VI | VII |
|---|---|---|---|---|---|---|---|
| Polymerization conditions Monomers | | | | | | | |
| Butadiene Amount charged (parts) | 67 | 67 | 67 | 53 | 72 | 67 | 67 |
| Acrylonitrile Amount charged (parts) | 33 | 33 | 33 | 47 | 28 | 33 | 33 |
| MW modifier PMHT | | | | | | | |
| Amount charged (parts) | 0.27 | 0.25 | 0.22 | 0.27 | 0.27 | — | 0.25 |
| Amount added (parts) | 0.07 | 0.1 | 0.13 | 0.10 | 0.13 | — | — |
| [Conversion on addition] (%) | [50] | [50] | [50] | [60] | [55] | — | — |
| Tert-Dodecyl mercaptan | | | | | | | |
| Amount charged (parts) | — | — | — | — | — | 0.25 | — |
| Amount added (parts) | — | — | — | — | — | 0.1 | — |
| [Conversion on addition] (%) | — | — | — | — | — | [50] | — |
| Polymerization time (hr) | 13.0 | 13.0 | 13.0 | 15.2 | 12.5 | 13.2 | 13.2 |
| Conversion on termination (%) | 85 | 85 | 85 | 90 | 80 | 85 | 90 |
| Properties of copolymer | | | | | | | |
| Mooney viscosity | 89 | 89 | 87 | 75 | 65 | 92 | 115 |
| Mn × 10$^{-4}$ | 11.0 | 9.5 | 8.0 | 9.5 | 9.0 | 10.2 | 10.8 |
| Mw × 10$^{-4}$ | 27.5 | 27.3 | 27.0 | 27.6 | 24.3 | 27.5 | 32.5 |
| Fraction of Mn ≦35,000 (%) | 5 | 10 | 15 | 11 | 10 | 10 | 2.5 |
| Bound butadiene (%) | 66 | 66 | 66 | 59 | 71 | 66 | 66 |
| Bound acrylonitrile (%) | 34 | 34 | 34 | 41 | 29 | 34 | 34 |
| Concentration of alkylthio group (mole %) | 0.08 | 0.08 | 0.08 | 0.09 | 0.10 | — | 0.07 |

TABLE 5

|  | Example | | | | | Comparative Example | | |
| --- | --- | --- | --- | --- | --- | --- | --- | --- |
|  | 1 | 2 | 3 | 4 | 5 | 1 | 2 | 3 |
| Copolymer | I | II | III | IV | V | VI | VII | VII |
| High-speed vulcanizability | | | | | | | | |
| Scorch time $T_5$ (min) | 2.2 | 2.2 | 2.2 | 2.3 | 2.2 | 3.0 | 2.2 | 3.3 |
| Maximum torque $V_{max}$ (kgf · cm) | 60 | 59 | 58 | 58 | 58 | 50 | 60 | 45 |
| Physical properties in ordinary state | | | | | | | | |
| Tensile strength (kgf/cm$^2$) | 146 | 147 | 148 | 150 | 145 | 140 | 148 | 135 |
| Elongation at break (%) | 400 | 400 | 400 | 390 | 400 | 430 | 390 | 500 |
| Tensile stress at 100% elongation (kgf/cm$^2$) | 32 | 32 | 32 | 33 | 33 | 28 | 33 | 24 |
| Hardness (JIS) | 66 | 66 | 66 | 66 | 66 | 64 | 66 | 60 |
| Impact resilience (%) | 42 | 42 | 42 | 22 | 50 | 40 | 42 | 40 |
| Oil resistance (volume change) (%) | 16 | 16 | 16 | 10 | 26 | 18 | 16 | 20 |
| Mold contamination | 2 | 2 | 2 | 2 | 2 | 3 | 2 | 5 |
| Processability | | | | | | | | |
| Die swell (%) | 89 | 88 | 86 | 70 | 64 | 85 | 120 | 115 |
| Extrusion rate (g/min) | 65 | 65 | 67 | 67 | 70 | 64 | 50.1 | 52.3 |
| Swelling, porosity | 4 | 4 | 4 | 4 | 4 | 4 | 3 | 3 |
| Edge | 3 | 3 | 3 | 3 | 3 | 3 | 2 | 3 |
| Surface | 4 | 4 | 4 | 4 | 4 | 4 | 2 | 4 |
| Corner | 3 | 3 | 3 | 4 | 3 | 3 | 3 | 3 |
| Total | 14 | 14 | 14 | 15 | 14 | 14 | 10 | 13 |

Figure 2:
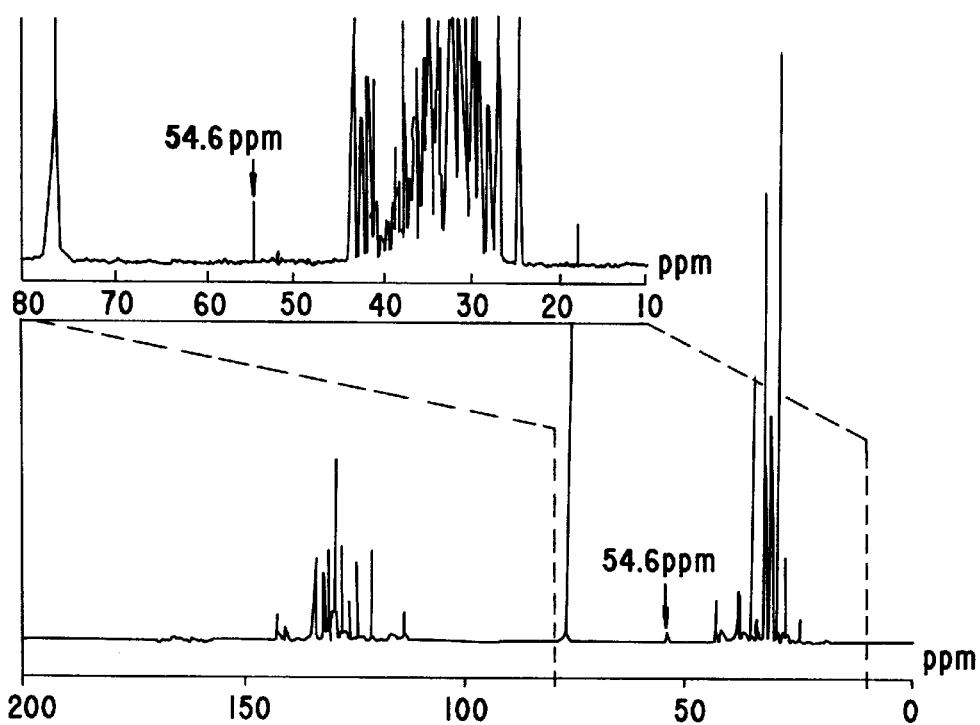
FIG. 2 is a chart of $^{13}$C-NMR determination of the unsaturated nitrile-conjugated diene copolymer of the present invention prepared in Example 5.

A chart of $^1$H-NMR determination of the unsaturated nitrile-conjugated diene copolymer V is shown in FIG. 1, and a chart of $^{13}$C-NMR determination of the unsaturated nitrile-conjugated diene copolymer V is shown in FIG. 2.

NMR determinations of the unsaturated nitrile-conjugated diene copolymers I to V and VII revealed that these copolymers had a 1,1-di(2,2'-dimethylpropyl)-1-ethylthio group.

As seen from Table 5, the vulcanizable rubber composition comprising each of the unsaturated nitrile-conjugated diene copolymers I to V and a sulfur-containing vulcanizer exhibits a short scorch time ($T_5$) and an increased maximum torque ($V_{max}$), as measured by using an oscillating disc rheometer. Thus the rubber composition has an excellent high-rate vulcanizability. This leads to a vulcanizate having a high tensile stress at 100% elongation and a high impact resilience strength, and thus the vulcanization efficiency is high. A problem of mold contamination also does not arise. Processing property as evaluated by Garvey die is satisfactory, and thus, the rubbers have good and balanced mechanical strength and processability.

In contrast, copolymer VI, which was prepared by using t-dodecyl mercaptan, i.e., a conventional and commercially available molecular weight modifier widely used in radical polymerization, exhibits a poor high-rate vulcanizability, and a problem of mold contamination arises. NMR determination of copolymers VI revealed that a 1,1-di(2,2-dimethylpropyl)-1-ethylthio group was not present in the copolymer.

Copolymer VII, which has a 1,1-di(2,2-dimethylpropyl)-1-ethylthio group but contains a fraction having a number average molecular weight not larger than 35,000 only to a minor extent, exhibits enhanced high-rate vulcanizability and high mechanical strength, but has poor processability. A rubber composition comprising copolymer VII and liquid NBR exhibits slightly improved processability, but the mechanical strengths including tensile strength are poor and mold contamination occurs. In contrast, the rubber compositions of the present invention exhibit improved processability while keeping a high mechanical strength.

EXAMPLE 6

By the same polymerization procedures as described in Examples 1 to 5, a acrylonitrile-butadiene copolymer VIII was made except that the amounts of acrylonitrile, butadiene and the PMHT molecular weight modifier were changed as shown in Table 6. When the conversion reached 35% and 55%, acrylonitrile was added in lots to the polymerization mixture in amounts shown in Table 6, and when the conversion reached 50%, PMHT was added to the polymerization mixture in an amount shown in Table 6. NMR determination of the acrylonitrile-butadiene copolymer VIII revealed that it contained a 1,1-di(2,2'-dimethylpropyl)-1-ethylthio group.

According to recipe C shown in Table 3, the acrylonitrile-butadiene copolymer VIII was kneaded together with a vinyl chloride resin by using a Banbury mixer to give a rubber composition. The rubber composition was subjected to press vulcanization at 160° C. for 20 minutes, and the physical properties of the vulcanizate were evaluated. The results are shown in Table 7.

COMPARATIVE EXAMPLE 4

By the same polymerization procedures as described in Example 6, acrylonitrile and butadiene were copolymerized to give a copolymer IX wherein commercially available t-dodecyl mercaptan (supplied by Phillips Petroleum Co.) was used as the molecular weight modifier instead of PMHT with all other conditions remaining substantially the same. The evaluation results of copolymer IX are shown in Table 6. A rubber vulcanizate was made from copolymer IX and the physical properties thereof were evaluated. The results are shown in Table 7.

TABLE 6

| Copolymer | XIII | IX |
|---|---|---|
| Polymerization conditions | | |
| Monomers | | |
| Butadiene | 73 | 66 |
| Amount charged (parts) | | |
| Acrylonitrile | 19 | 34 |
| Amount charge (parts) | | |
| Amount added (parts) | 3 | — |
| [Conversion on addition] (%) | [35] | — |
| Amount added (parts) | 6 | — |
| [Conversion on addition] (%) | [55] | — |
| MW modifier | | |
| PMHT | | |
| Amount charged (parts) | 0.28 | — |
| Amount added (parts) | 0.16 | — |
| [Conversion on addition] (%) | [50] | — |
| tert.-Dodecyl mercaptan | — | 0.46 |
| Amount charged (parts) | | |
| Polymerization time (hr) | 13 | 13 |
| Conversion on termination (%) | 75 | 85 |
| Properties of copolymer | | |
| Mooney viscosity | 40 | 36 |
| $Mn \times 10^{-4}$ | 7.5 | 7.5 |
| $Mw \times 10^{-4}$ | 22.3 | 22.4 |
| Fraction of Mn 35,000 (%) | 12 | 2.5 |
| Bound butadiene (%) | 72 | 67 |
| Bound acrylonitrile (%) | 28 | 33 |
| ΔAN | 6 | 9 |
| Concentration of alkylthio group (mole %) | 0.10 | 0 |

TABLE 7

| Copolymer | Example 6 VIII | Com. Ex. 4 IX |
|---|---|---|
| NBR/Vinyl chloride resin ratio | 70/30 | 70/30 |
| High-speed vulcanizability | | |
| Scorch time $T_5$ (min) | 4.0 | 5.5 |
| Maximum torque $V_{max}$ (kgf · cm) | 26 | 20 |
| Physical properties in ordinary state | | |
| Tensile strength (kgf/cm²) | 159 | 155 |
| Elongation at break (%) | 430 | 480 |
| Tensile stress at 100% elongation (kgf/cm²) | 60 | 60 |
| Hardness (JIS) | 73 | 72 |
| Permanent set | 43 | 43 |
| Oil resistance (Fuel C) | | |
| (volume change) (%) | +45 | +32 |
| Cold resistance | | |
| ($T_{10}$) (°C.) | −22 | −19 |
| Mold contamination | 1 | 3 |
| Processability *1 | | |
| Die swell (%) | 50 | 50 |
| Extrusion rate (g/min) | 88 | 113 |
| Swelling, porosity | 4 | 4 |
| Edge | 4 | 4 |
| Surface | 4 | 4 |
| Corner | 4 | 4 |
| Total | 16 | 16 |
| Ozone resistance *2 | | |
| 20% elongation, 336 hrs | NC | NC |
| 40% elongation, 72 hrs | NC | NC |

TABLE 7-continued

| Copolymer | Example 6 VIII | Com. Ex. 4 IX |
|---|---|---|

*1 Temperature of extrusion barrel 60° C.
Temperature of extrusion head 80° C.
*2 NC: Crack occurrence was not observed As seen from Table 7, a vulcanizable rubber composition comprising unsaturated nitrile-conjugated diene copolymer VIII, a vinyl chloride resin and a sulfur-containing vulcanizer (Example 6) exhibits a short scorch time ($T_5$) and an increased maximum torque ($V_{max}$) as measured by using an oscillating disc rheometer. Thus the rubber composition has an excellent high-rate vulcanizability, and gives a vulcanizate having a high tensile stress at 100% elongation, a high strength and a reduced compression set. Thus the vulcanization efficiency is high. Excellent ozone-resistance is manifested while a high tensile strength and a high tensile stress at 100% elongation are maintained.

Copolymer VIII used in Example 6 was prepared by adding acrylonitrile in lots during polymerization, and therefore, the rubber vulcanizate made therefrom exhibits a small $T_{10}$ as measured by the Gehman tortional test and a reduced volume change after immersion in oil, although the bound acrylonitrile content in the copolymer is low. Namely the rubber vulcanizate has good and balanced oil resistance and cold resistance, while a high mechanical strength was kept. Further copolymer VIII was prepared by adding PMHT in lots during polymerization, and therefore, the vulcanizable rubber composition exhibits good processability as measured by using a Garvey die. Thus both mechanical strength and processability are high.

In contrast, copolymer IX used in Comparative Example 4 was prepared by using a conventional and commercially available t-dodecylmercaptan, and therefore, a rubber composition thereof exhibits a long scorch time ($T_5$) and a reduced maximum torque ($V_{max}$), and thus, a poor high-rate vulcanizability. The mechanical strength is low and the mold contamination is unsatisfactory. NMR determination of copolymer IX revealed that a 1,1-di(2,2-dimethylpropyl)-1-ethylthio group was not present in the copolymer.

EXAMPLES 7 TO 18

Acrylonitrile-butadiene copolymer latexes were prepared by the same procedures as described in Examples 1 to 5 wherein the amounts of butadiene, acrylonitrile and PMHT molecular weight modifier were varied as shown in Table 8 with all other conditions remaining the same. To each copolymer latex, one part of an oxyethylene-oxypropylene adduct of an alkylphenol formalin condensate (nonionic surface active agent "Rumtel NP-5150") was added. A 5 liter-volume coagulating vessel provided with a stirrer was charged with a coagulating aqueous solution containing 3 parts of aluminum sulfate as a coagulant, and the above-mentioned copolymer latex was dropwise added into the coagulating vessel. The coagulating bath in the vessel was maintained at 50° C. to coagulate the copolymer. The thus-obtained crums were collected, washed with water, and then dried at 50° C. under a reduced pressure. Thus copolymers X through XVI were obtained.

Copolymers XII and XIII were prepared by a procedure wherein acrylonitrile was added in lots in amounts shown in Table 8 to a polymerization mixture when the polymerization conversion reached 35% and 55%. Copolymers XI and XIII were prepared by a procedure wherein PMHT was added in lots in an amount shown in Table 8 to a polymerization mixture when the polymerization conversion reached 50%.

The contents of bound butadiene and bound acrylonitrile in the copolymers and the Mooney viscosity and other properties of the copolymers are shown in Table 8. NMR determination of acrylonitrile-butadiene copolymers X to XVI revealed that a 1,1-di(2,2-dimethylpropyl)-1-ethylthio group was present in these copolymers.

According to the recipe shown in Table 3 (recipe C), each copolymer was mixed with a reinforcing filler shown in Table 9, and the mixture was kneaded together by a Banbury mixer to give a rubber composition. The rubber composition was subjected to a press vulcanization at 160° C. for 20 minutes, and the physical properties of the thus-obtained vulcanizate were evaluated. The results are shown in Table 9 and Table 10.

COMPARATIVE EXAMPLE 5

Butadiene and acrylonitrile were copolymerized under the same conditions as employed in Example 7 except that the molecular weight modifier used was changed to commercially available t-dodecyl mercaptan (supplied by Phillips Petroleum Co.) to give copolymer XVII. The properties of copolymer XVII are shown in Table 8. NMR determination of the copolymer revealed that a 1,1-di(2,2-dimethylpropyl)-1-ethylthio group was not present therein.

A rubber vulcanizate ;was made from copolymer XVII by the same procedures as described in Example 7, and the properties thereof were evaluated. The results are shown in Table 9 and Table 10.

TABLE 8

| Copolymer | X | XI | XII | XIII | XIV | XV | XVI | XVII |
|---|---|---|---|---|---|---|---|---|
| Polymerization conditions | | | | | | | | |
| Monomers | | | | | | | | |
| Butadiene | | | | | | | | |
| Amount charged (parts) | 67 | 67 | 71 | 71 | 53 | 67 | 67 | 67 |
| Acrylonitrile | | | | | | | | |
| Amount charged (parts) | 33 | 33 | 22 | 22 | 47 | 33 | 33 | 33 |
| Amount added (parts) | — | — | 4 | 4 | — | — | — | — |
| [Conversion on addition] (%) | | | [35] | [35] | | | | |
| Amount added (parts) | | | 3 | 3 | | | | |
| [Conversion on addition] (%) | | | [35] | [55] | | | | |
| MW modifier | | | | | | | | |
| PMHT | | | | | | | | |
| Amount charged (parts) | 0.46 | 0.27 | 0.43 | 0.27 | 0.41 | 0.48 | 0.40 | — |
| Amount added (parts) | — | 0.16 | — | 0.16 | — | — | — | — |
| [Conversion on addition] (%) | | [50] | | [50] | | | | |
| tert.-Dodecyl mercaptan | | | | | | | | |
| Amount charged (parts) | — | — | — | — | — | — | — | 0.45 |
| Polymerization time (hr) | 12.5 | 12.5 | 12.5 | 12.5 | 12 | 12 | 12 | 12 |
| Conversion on termination (%) | 78 | 78 | 80 | 80 | 85 | 78 | 80 | 80 |
| Properties of copolymer | | | | | | | | |
| Mooney viscosity | 65 | 67 | 67 | 66 | 67 | 51 | 90 | 65 |
| Mn × $10^{-4}$ | 8.3 | 8.0 | 8.1 | 7.9 | 8.0 | 8.1 | 10.3 | 8.5 |
| Mw × $10^{-4}$ | 27.4 | 28.0 | 27.0 | 28.1 | 28.0 | 21.1 | 36.1 | 27.1 |
| Fraction of Mn ≦35,000 (%) | 3 | 12 | 3 | 12 | 3 | 3 | 3 | 3 |
| Bound butadiene (%) | 66 | 66 | 68 | 68 | 60 | 66 | 66 | 66 |
| Bound acrylonitrile (%) | 34 | 34 | 32 | 32 | 40 | 34 | 34 | 34 |
| ΔAN | 10 | 10 | 7 | 7 | 10 | 10 | 10 | 10 |
| Concentration of alkylthio group (mole %) | 0.10 | 0.10 | 0.11 | 0.10 | 0.09 | 0.12 | 0.08 | — |

TABLE 9

| | Example | | | | | | | | | | | | Co. Ex. |
|---|---|---|---|---|---|---|---|---|---|---|---|---|---|
| | 7 | 8 | 9 | 10 | 11 | 12 | 13 | 14 | 15 | 16 | 17 | 18 | 5 |
| Copolymer | X | X | X | X | X | XI | XII | XIII | XIV | XV | XVI | X | XVII |
| Non-black reinforcing filler | | | | | | | | | | | | | |
| Silica *1 | 30 | — | — | — | — | 30 | 30 | 30 | 30 | 35 | 25 | — | 30 |
| Silica *2 | — | — | — | — | — | — | — | — | — | — | — | 30 | — |
| Ground limestone *3 | — | 130 | — | — | — | — | — | — | — | — | — | — | — |
| Activated calcium carbonate *4 | — | — | 40 | — | — | — | — | — | — | — | — | — | — |
| Clay *5 | — | — | — | 150 | — | — | — | — | — | — | — | — | — |
| Basic magnesium carbonate *6 | — | — | — | — | 100 | — | — | — | — | — | — | — | — |

TABLE 9-continued

| | Example | | | | | | | | | | | | Co. Ex. |
|---|---|---|---|---|---|---|---|---|---|---|---|---|---|
| | 7 | 8 | 9 | 10 | 11 | 12 | 13 | 14 | 15 | 16 | 17 | 18 | 5 |
| Copolymer | X | X | X | X | X | XI | XII | XIII | XIV | XV | XVI | X | XVII |
| High-speed vulcanizability | | | | | | | | | | | | | |
| Scorch time $T_5$ (min) | 3.3 | 3.3 | 3.4 | 3.2 | 3.4 | 3.3 | 3.3 | 3.2 | 3.2 | 3.3 | 3.3 | 3.3 | 4.1 |
| Maximum torque $V_{max}$ (kgf · cm) | 41.1 | 38.0 | 37.5 | 42.0 | 42.0 | 40.1 | 40.0 | 41.0 | 41.0 | 40.0 | 40.0 | 41.1 | 31.0 |
| Physical properties in ordinary state | | | | | | | | | | | | | |
| Tensile strength (kgf/cm$^2$) | 135 | 40 | 70 | 80 | 150 | 133 | 132 | 133 | 135 | 135 | 134 | 133 | 135 |
| Elongation at break (%) | 580 | 500 | 580 | 560 | 600 | 580 | 570 | 580 | 590 | 580 | 570 | 590 | 620 |
| Tensile stress at 100% elongation (kgf/cm$^2$) | 19 | 15 | 13 | 20 | 21 | 20 | 20 | 19 | 21 | 20 | 21 | 19 | 15 |
| Hardness (JIS) | 65 | 63 | 63 | 64 | 66 | 65 | 65 | 65 | 65 | 65 | 65 | 65 | 65 |
| Impact resilience (%) | 42 | 42 | 47 | 47 | 41 | 41 | 42 | 42 | 24 | 41 | 42 | 41 | 38 |
| Oil resistance (volume change) | +15 | +15 | +15 | +15 | +15 | +18 | +13 | +10 | +15 | +15 | +15 | +15 | +15 |
| Cold resistance (Gehman $T_{10}$) | −23 | −23 | −23 | −23 | −23 | −18 | −25 | −15 | −23 | −23 | −23 | −23 | −23 |

*1 Carplex 1120 supplied by Shionogi & Co.
*2 Nipsil VN3 supplied by Nippon Silica Co.
*3 Whiton SSB supplied by Shiraishi Calcium Co.
*4 Hakuenka CC supplied by Shiraishi Kougyo K.K.
*5 Dixie clay supplied by Vanderbilt Co.
*6 TT supplied by Tokuyama Soda Co.

TABLE 10

| | Example | | | | | | | | | | | | Co. Ex. |
|---|---|---|---|---|---|---|---|---|---|---|---|---|---|
| | 7 | 8 | 9 | 10 | 11 | 12 | 13 | 14 | 15 | 16 | 17 | 18 | 5 |
| Copolymer | X | X | X | X | X | XI | XII | XIII | XIV | XV | XVI | X | XVII |
| Mold contamination | 1 | 1 | 1 | 1 | 1 | 1 | 1 | 1 | 1 | 1 | 1 | 1 | 3 |
| Processability (Garvey die extrusion) | | | | | | | | | | | | | |
| Die swell (%) | 100 | 115 | 121 | 111 | 113 | 95 | 122 | 95 | 110 | 100 | 100 | 100 | 117 |
| Extrusion rate (g/min) | 60 | 63 | 60 | 68 | 60 | 70 | 59 | 75 | 70 | 80 | 75 | 62 | 59 |
| Swelling, porocity | 3 | 3 | 3 | 3 | 3 | 3 | 3 | 3 | 3 | 3 | 4 | 3 | 3 |
| Edge | 4 | 4 | 3 | 3 | 3 | 3 | 3 | 3 | 3 | 3 | 3 | 3 | 3 |
| Surface | 3 | 3 | 4 | 4 | 4 | 4 | 4 | 4 | 4 | 4 | 4 | 4 | 3 |
| Corner | 4 | 4 | 4 | 4 | 4 | 5 | 4 | 5 | 4 | 4 | 4 | 4 | 4 |
| Total | 14 | 14 | 14 | 14 | 14 | 15 | 14 | 15 | 14 | 14 | 15 | 14 | 13 |

As seen from Table 9 and Table 10, the vulcanizable rubber composition (Examples 7 to 18) comprising each of copolymers X to XVI, an inorganic reinforcing filler and a sulfur-containing vulcanizer exhibits a short scorch time ($T_5$) and an increased maximum torque ($V_{max}$), as measured by using an oscillating disc rheometer. As seen from the comparison of Examples 7 and 12 to 17 with Comparative Example 5, the rubber composition of the present invention has a high-rate vulcanizability and thus exhibits an enhanced tensile stress at 100% elongation and an increased impact resilience, without reduction of tensile strength. Namely, the vulcanization efficiency of the rubber composition of the present invention is high. The mold contamination also is satisfactory.

In Examples 7 to 18, a copolymer latex was coagulated with aluminum sulfate as a coagulant in the course of production, and thus the resultant copolymer is substantially free from halogen and does not cause a problem of metal corrosion.

Copolymers XII and XIII (Examples 13 and 14), prepared by adding acrylonitrile in lots to a polymerization mixture during polymerization, exhibits a small $T_{10}$ as measured by the Gehman tortional test and a reduced volume change when immersed in an oil, and therefore, the oil resistance and the cold resistance are good and balanced while a high level of tensile strength is maintained.

Copolymers XI and XIII (Examples 12 and 14), prepared by adding PMHT molecular weight modifier in lots to a polymerization mixture during polymerization, exhibits enhanced processability as measured the Garvey die method. Namely the processability and the mechanical strength are good and balanced.

In contrast, copolymer XVII (Comparative Example 5), prepared by an emulsion polymerization using t-dodecyl mercaptan, i.e., a conventional and commercially available molecular weight modifier widely used in radical polymerization, exhibits a short scorch time ($T_5$) and an increased maximum torque ($V_{max}$), as measured by using an oscillating disc rheometer. Thus the high-rate vulcanizability is poor and the tensile strength is low. The mold contamination also is not satisfactory.

EXAMPLES 19, 20 AND COMPARATIVE EXAMPLES 6, 7

Copolymer latexes were prepared by the same procedures as employed in Examples 1 to 5 except that the amounts of butadiene, acrylonitrile and PMHT molecular weight modifier were varied as shown in Table 11.

A nonionic surface active agent shown in Table 11 was incorporated in each copolymer latex (the amounts in Table 11 are by weight). A 5 liter-volume coagulating vessel equipped with a stirrer was charged with a coagulating aqueous bath having dissolved therein a coagulant shown in Table 11, and the above-mentioned copolymer latex was dropwise added to the coagulating bath. The coagulating bath was maintained at the temperature shown in Table 11 to coagulate the copolymer latex. The thus-produced crumbs were collected, washed with water and then dried at 50° C. under a reduced pressure to give a copolymer. The amounts of bound butadiene and bound acrylonitrile in the copolymer and the Mooney viscosity and other properties of the copolymer were evaluated. The results are shown in Table 12. NMR determination of the copolymers prepared in Examples 19 and 20 revealed that 1,1-di(2,2-dimethylpropyl)-1-ethylthio group was present in the copolymers.

In Examples 19 and 20, an acrylonitrile monomer and PMHT molecular weight modifier were incorporated in lots in a polymerization mixture when the conversion reached the predetermined values during the polymerization.

A rubber composition was made from each copolymer according to the recipe shown in Table 1 by kneading the respective ingredients by a Banbury mixer. The rubber composition was subjected to a press vulcanization at 160° C. for 20 minutes, and the properties of the vulcanizate were evaluated. The results are shown in Table 13.

COMPARATIVE EXAMPLE 8

Copolymerization of butadiene with acrylonitrile was conducted by the same procedures as employed in Example 19 except that commercially available t-dodecyl mercaptan supplied by Phillips Petroleum Co. was used instead of the PMHT as the molecular weight modifier, and was incorporated at one time. The properties of the thus-obtained copolymer are shown in Table 12. A rubber composition was made from the copolymer, and a vulcanizate was made therefrom and the physical properties thereof were evaluated. The results are shown in Table 13.

TABLE 11

| | Example | | Comparative Example | | |
|---|---|---|---|---|---|
| | 19 | 20 | 6 | 7 | 8 |
| Monomers | | | | | |
| Butadiene | | | | | |
| Amount charged (parts) | 71 | 75 | 67 | 67 | 67 |
| Acrylonitrile | | | | | |
| Amount charged (parts) | 22 | — | 33 | 33 | 33 |
| Amount added (parts) | 4 | 6 | — | — | — |
| [Conversion on addition] (%) | [35] | [35] | — | — | — |
| | 3 | — | — | — | — |
| | [55] | | | | |
| MW modifier | | | | | |
| PMHT | | | | | |
| Amount charged (parts) | 0.27 | 0.25 | 0.45 | 0.45 | — |
| Amount added (parts) | 0.16 | 0.15 | — | — | — |
| [Conversion on addition] (%) | [50] | [50] | — | — | — |
| TDM | | | | | |
| Amount charged (parts) | — | — | — | — | 0.4 |
| Nonionic surface active agent | | | | | |
| Aluminum sulfate | 3 | — | — | 3 | — |
| Magnesium sulfate | — | — | — | — | — |
| Calcium chloride | — | — | — | 15 | — |
| Sodium chloride | — | — | — | 20 | — |
| Coagulating temperature (°C.) | 50 | 50 | 50 | 50 | 50 |

*1 An oxyethylene-oxypropylene adduct of an alkylphenol-formalin condensate
*2 Molecular weight modifier:
PMHT = 2,2',4,6,6'-Pentamethyl-heptane-4-thiol
TDM = tert-Dodecylmercaptan

TABLE 12

| | Example | | Comparative Example | | |
|---|---|---|---|---|---|
| | 19 | 20 | 6 | 7 | 8 |
| Polymerization conditions | | | | | |
| Polymerization time (hr) | 12.5 | 11.5 | 13.5 | 13.0 | 12.8 |
| Conversion on termination (%) | 80 | 77 | 85 | 85 | 85 |
| Properties of copolymer | | | | | |
| Mooney viscosity | 51 | 60 | 55 | 50 | 50 |
| Mn × $10^{-4}$ | 7.8 | 8.0 | 8.0 | 7.6 | 7.6 |
| Mw × $10^{-4}$ | 21.8 | 22.2 | 22.0 | 21.0 | 21.0 |
| Fraction of Mn ≧ 35,000 (%) | 15 | 13 | 2.5 | 2.5 | 2.5 |
| Bound butadiene (%) | 66 | 72 | 66 | 66 | 66 |
| Bound acrylonitrile (%) | 34 | 28 | 34 | 34 | 34 |
| ΔAN | 9 | 9 | 21 | 21 | 21 |
| Alkylthio group concentration (mole %) | 0.10 | 0.10 | 0.09 | 0.09 | 0 |
| Residual chlorine concentration (ppm) | 0.9 | 1.2 | 70 | 95 | 1.5 |
| Particle diameter of crumbs (cm) | 1.1 | 1.2 | 0.7 | 0.9 | 1.1 |

TABLE 13

| | Example | | Comparative Example | | |
|---|---|---|---|---|---|
| | 19 | 20 | 6 | 7 | 8 |
| High-speed vulcanizability | | | | | |
| Scorch time $T_5$ (min) | 2.2 | 2.3 | 2.2 | 2.2 | 3.0 |
| Maximum torque $V_{max}$ (kgf · cm) | 58 | 59 | 60 | 61 | 49 |
| Physical properties in ordinary state | | | | | |
| Tensile strength (kgf/cm$^2$) | 149 | 150 | 150 | 151 | 146 |
| Elongation at break (%) | 380 | 390 | 400 | 390 | 420 |
| Tensile stress at 100% elongation (kgf/cm$^2$) | 32 | 33 | 33 | 33 | 26 |
| Hardness (JIS) | 66 | 66 | 66 | 66 | 64 |
| Impact resilience | 43 | 51 | 42 | 42 | 40 |
| Cold resistance (Gehman tortional test) | | | | | |
| $T_{10}$ (°C.) | −29 | −33 | −27 | −27 | −27 |
| Mold contamination | 0 | 0 | 5 | 5 | 0 |
| Metal corrosion | 1 | 1 | 2 | 2 | 3 |
| Processability | | | | | |
| Die swell (%) | 110.0 | 80.0 | 120.0 | 121.0 | 122.0 |
| Extrusion rate (g/min) | 60.0 | 70.0 | 50.0 | 49.0 | 50.0 |
| Swelling, porosity | 3 | 4 | 3 | 3 | 3 |
| Edge | 3 | 3 | 3 | 3 | 3 |
| Surface | 4 | 4 | 3 | 3 | 3 |
| Corner | 4 | 4 | 3 | 3 | 3 |
| Total | 14 | 15 | 12 | 12 | 12 |

As seen from Table 13, a vulcanizable rubber composition (Examples 19, 20) comprising the copolymer of the present invention and a sulfur-containing vulcanizer exhibits a short scorch time ($T_5$) and an increased maximum torque ($V_{max}$), as measured by using an oscillating disc rheometer, and thus, has an excellent high-rate vulcanizability. Therefore, the tensile strength at 100% elongation, tensile strength and impact resilience are high and the vulcanization efficiency is enhanced. Further, the unsaturated nitrile-conjugated diene copolymer is substantially free from halogen, and therefore, does not cause a problem of metal corrosion. The mold contamination also is satisfactory.

In Examples 19 and 20, acrylonitrile is added in lots to a polymerization mixture during polymerization, and thus the copolymer exhibits a reduced ΔAN, a small $T_{10}$ as measured by the Gehman tortional test and a reduced volume change when immersed in an oil. Therefore, the oil resistance and the cold resistance are good and balanced while a high level of tensile strength is maintained.

Further in Examples 19 and 20, PMHT molecular weight modifier is added in lots to a polymerization mixture during polymerization, and thus the copolymer exhibits enhanced processability as measured the Garvey die method. Namely the processability and the mechanical strength are good and balanced.

In contrast, in Comparative Example 8, an emulsion polymerization is carried out by using t-dodecyl mercaptan, i.e., a conventional and commercially available molecular weight modifier widely used in radical polymerization, and thus the copolymer has a poor high-rate vulcanizability, a low tensile strength and a small impact resilience. The mold contamination also is not satisfactory. NMR determination of this copolymer revealed that a 1,1-di(2,2-dimethylpropyl) -1-ethylthio group was not present in the copolymer.

INDUSTRIAL APPLICABILITY

The unsaturated nitrile-conjugated diene copolymer of the present invention gives a rubber composition exhibiting a high-rate vulcanizability when vulcanized at a high temperature for a short time, and not causing a problem of mold contamination. Due to the high-rate vulcanizability, the rubber composition is suitable especially for injection molding, and production of rubber articles can be effected at a reduced cost and with a saved energy.

By addition of the molecular weight modifier in lots in a polymerization mixture during polymerization for the preparation of the unsaturated nitrile-conjugated diene copolymer, the productivity of the copolymer is enhanced and the copolymer gives a rubber composition having an improved processability.

When a vinyl chloride resin is incorporated in a rubber composition comprising the copolymer of the present invention, the resulting rubber composition keeps a good high-rate vulcanizability and is capable of giving a vulcanizate exhibiting an improved weather resistance without substantial deterioration of the permanent set and tensile strength. Further when a nonblack reinforcing filler is incorporated in a rubber composition comprising the copolymer of the present invention, a reinforcing effect of a high level similar to that attained by the incorporation of carbon black can be achieved.

A rubber composition comprising the unsaturated nitrile-conjugated diene copolymer of the present invention is useful for sealing materials such as an O-ring, and for other rubber articles including belts, hoses and rolls.

We claim:

1. An unsaturated nitrile-conjugated diene copolymer having at least 0.03 mole, per 100 moles of the monomeric units constituting the copolymer molecule, of an alkylthio group with 12 to 16 carbon atoms, which include at least three tertiary carbon atoms, and further with a sulfur atom directly bound to at least one of the tertiary carbon atoms; said copolymer having a Mooney viscosity of 15 to 150 and containing 3 to 20% by weight of a low-molecular-weight fraction having a number average molecular weight of not larger than 35,000.

2. The unsaturated nitrile-conjugated diene copolymer according to claim 1, which has at least 0.07 mole, per 100 moles of the monomeric units constituting the molecule, of said alkylthio group.

3. The unsaturated nitrile-conjugated diene copolymer according to claim 1, wherein said alkylthio group is at least one member selected from 1,1-di(2,2-dimethylpropyl)-1-ethylthio group and a 1-(2,2-dimethylpropyl)-1-(2,2,4,4-tetramethylpentyl)-1-ethylthio group.

4. The unsaturated nitrile-conjugated diene copolymer according to claim 1, wherein said alkylthio group is 1,1-di(2,2-dimethylpropyl)-1-ethylthio group.

5. The unsaturated nitrile-conjugated diene copolymer according to claim 1, which comprises 10 to 60% by weight of unsaturated nitrile units, 90 to 40% by weight of conjugated diene units, and 0 to 10% by weight of copolymerizable monomer units.

6. The unsaturated nitrile-conjugated diene copolymer according to claim 1, which comprises 10 to 60% by weight of acrylonitrile units, 90 to 40% by weight of butadiene units and has a Mooney viscosity of 20 to 90.

7. The unsaturated nitrile-conjugated diene copolymer according to claim 1, wherein the ratio (Mw/Mn) of the weight average molecular weight (Mw) to the number average molecular weight (Mn) of said unsaturated nitrile-conjugated diene copolymer is in the range of 2.3 to 5.5.

8. The unsaturated nitrile-conjugated diene copolymer according to claim 1, which has a halogen content in the range from zero to not more than 3 ppm.

9. A process for producing an unsaturated nitrile-conjugated diene copolymer wherein an unsaturated nitrile and a conjugated diene are copolymerized in the presence of a molecular weight modifier and a free radical initiator, characterized in that the molecular weight modifier used is an alkylthiol compound with 12 to 16 carbon atoms, which include at least three tertiary carbon atoms, and further with a sulfur atom directly bound to at least one of the tertiary carbon atoms, and further in that 10 to 95% by weight of the entire amount of the molecular weight modifier is incorporated in a monomer mixture before commencement of copolymerization, and, when the polymerization conversion reaches a value of 20 to 70%, the remainder of the molecular weight modifier is incorporated in a polymerization mixture.

10. The process according to claim 9, wherein the unsaturated nitrile-conjugated diene copolymer wherein said alkylthiol compound is selected from 2,2',4,6,6'-pentamethylheptane-4-thiol and 2,2',4,6,6',8,8'-heptamethylnonane-4-thiol.

11. The process according to claim 9, wherein the molecular weight modifier is used in an amount of 0.05 to 3 parts by weight per 100 parts by weight of the total monomer weight.

12. The process according to claim 9, wherein the copolymerization is effected by an emulsion polymerization procedure using a carboxylic acid-containing emulsifier.

13. The process according to claim 9, wherein, when the polymerization conversion reaches a value of 20 to 70%, the remainder of the molecular weight modifier is incorporated in lots in the polymerization mixture.

14. The process according to claim 9, wherein said copolymerization is effected by an emulsion polymerization procedure to obtain a latex of the unsaturated nitrile-conjugated diene copolymer, a nonionic surface active agent is added to the copolymer latex, the latex is then introduced in a coagulating bath having a metal salt dissolved therein and substantially not containing halogens, and then, the latex-introduced coagulating bath is heated thereby the copolymer latex is coagulated.

15. The process according to claim 14, wherein said nonionic surface active agent is an alkylene oxide adduct of an alkylphenol-formaldehyde condensate, said adduct having a cloud point of 10° to 100° C.; and the amount of said adduct is 0.01 to 0.5 part by weight per 100 parts by weight of the copolymer.

16. The process according to claim 14, wherein said metal salt is at least one compound selected from aluminum sulfate, magnesium sulfate and aluminum sulfate.

17. A vulcanizate rubber composition comprising 100 parts by weight of an unsaturated nitrile-conjugated diene copolymer and 0.01 to 100 parts by weight of a sulfur-containing vulcanizer;

said copolymer having at least 0.03 mole, per 100 moles of the monomeric units constituting the copolymer molecule, of an alkylthio group with 12 to 16 carbon atoms, which include at least three tertiary carbon atoms, and further with a sulfur atom directly bound to at least one of the tertiary carbon atoms; said copolymer having a Mooney viscosity of 15 to 150 and containing 3 to 20% by weight of a low-molecular-weight fraction having a number average molecular weight of not larger than 35,000.

18. The vulcanizable rubber composition according to claim 17, wherein said alkylthio group is at least one member selected from 1,1-di(2,2-dimethylpropyl)-1-ethylthio group and a 1-(2,2-dimethylpropyl)-1-(2,2,4,4-tetramethylpentyl)-1-ethylthio group; and the amount of the alkylthio group is at least 0.07 mole per 100 moles of the monomeric units constituting the molecule.

19. The vulcanizable rubber composition according to claim 17, which further comprises a vinyl chloride resin; and the ratio of the unsaturated nitrile-conjugated diene copolymer to the vinyl chloride resin is in the range of 95/5 to 50/50 by weight.

20. The vulcanizable rubber composition according to claim 17, which further comprises 10 to 500 parts by weight, per 100 parts by weight of the unsaturated nitrile-conjugated diene copolymer, of a non-black reinforcing filler.

21. The vulcanizable rubber composition according to claim 20, wherein the non-black reinforcing filler is at least one material selected from basic magnesium carbonate, activated calcium carbonate and ultrafine magnesium silicate.

22. The vulcanizable rubber composition according to claim 17, which is injection-molded.

23. The vulcanizable rubber composition according to claim 17, which is used for a hose, a belt or an O-ring.

* * * * *